United States Patent [19]

Snyder, Jr.

[11] Patent Number: 4,907,502
[45] Date of Patent: * Mar. 13, 1990

[54] HOME CHOCOLATE PROCESSING APPARATUS

[75] Inventor: Francis H. Snyder, Jr., Danbury, Conn.

[73] Assignees: Olaf Kayser, Stamford; George Meyerie, Brookfield, both of Conn.

[*] Notice: The portion of the term of this patent subsequent to Nov. 17, 2004 has been disclaimed.

[21] Appl. No.: 105,546

[22] Filed: Oct. 5, 1987

Related U.S. Application Data

[63] Continuation-in-part of Ser. No. 796,000, Nov. 7, 1985, Pat. No. 4,706,558.

[51] Int. Cl.⁴ ............................................. A23G 1/00
[52] U.S. Cl. ...................................... 99/455; 99/348; 99/483; 99/486; 99/517; 366/146; 366/200
[58] Field of Search ................. 99/452, 453, 455, 483, 99/516, 517, 348, 467, 470, 485, 486; 366/145–147, 200, 230, 221, 231; 241/101.5; 426/306, 520

[56] References Cited

U.S. PATENT DOCUMENTS

| | | |
|---|---|---|
| 1,596,860 | 8/1926 | Klaus .................................. 366/145 |
| 2,255,986 | 9/1941 | Rapisarda . |
| 2,725,815 | 12/1955 | Hansen . |
| 2,831,418 | 4/1958 | Ponisch . |
| 3,021,779 | 2/1962 | Sollich . |
| 3,058,413 | 10/1962 | Cavalieri . |
| 3,115,821 | 12/1963 | Hubner ......................... 366/221 X |
| 3,430,927 | 5/1969 | Pouzar . |
| 3,756,141 | 9/1973 | Rose . |
| 4,178,105 | 12/1979 | Sollich ................................ 99/455 |
| 4,706,558 | 11/1987 | Snyder, Jr. ........................ 99/455 |

OTHER PUBLICATIONS

Advertisement "Little Dipper", Hilliard's Chocolate Systems, Inc., date unknown.

Primary Examiner—Timothy F. Simone
Attorney, Agent, or Firm—St. Onge Steward Johnston & Reens

[57] ABSTRACT

A bowl, which accommodates a coating, is removably mounted in a casing. A moving device in the casing is coupled to the bowl for rotating said bowl. A heater is positioned in the casing in operative proximity with the bowl for melting the chocolate. A cooling unit is positioned in the casing in operative proximity with the bowl for cooling the coating. A control circuit is electrically connected to the heater and cooling unit for controlling the heating and cooling of the coating.

13 Claims, 7 Drawing Sheets

BASIC UNIT

DELUXE UNIT

HOME CHOCOLATE PROCESSING APPARATUS

BACKGROUND OF THE INVENTION

This application is a Continuation-in-Part of U.S. Ser. No. 796,000 filed Nov. 7, 1985, Pat. No. 4,706,508.

The present invention relates to home chocolate processing apparatus and the novel method of making chocolate candies.

The techniques for processing pure chocolate into chocolate candies are taught in industry, but such techniques have not been made available to the consumer, due in part to the high cost, large size, and required expertise in the use of such equipment.

The interest in chocolate world-wide has intensified over the past years. This interest is manifested best by the emergence and success of the so-called gourmet chocolate shops and store boutiques. Some of these products are selling for up to $32 per pound! During 1984, a new magazine "Chocolatier" was introduced which deals exclusively with the subject of producing chocolate-based delicacies in the home. This magazine is enjoying high growth, thereby indicating that the public is very interested in processing this relatively exotic material in the home. A great many people around the world love chocolate.

At the present time, the ability to produce very high quality pure chocolate candies in the home is all but impossible. The reasons for this relate to the chemistry of pure chocolate, which is made up of pure cocoa, cocoa butter and sugars, as major ingredients. Imitation chocolate replaces cocoa butter with fats that do not have the desired qualities that cocoa butter imparts chocolate candies.

Pure chocolate used in the production of chocolate candies is referred to as "coating" in the industry and has two crystal states, tempered and untempered. The desired state is the production of tempered coatings, but in order to produce them, the temperature and agitation of the coating must be maintained within very narrow limits. Imitation chocolate or "composites" are generally much easier to process into finished candies due to less sensitivity to temperature. "Coating" as used herein is intended to mean pure chocolate, as in the industry.

Typically, in a known method, a coating is introduced into a vat where it is stirred while the coating is allowed to reach gently the initial melting temperature. The coating is then allowed to drop to some lower temperature and then brought up to some intermediate temperature for final processing into candy. These temperatures are normally held to well within one degree F. The coating is gently agitated during the heating-cooling cycle and such agitation continues during the processing cycle. It becomes obvious that if one is to attempt to carry out these processing steps in the home, via the use of a double boiler, stove, microwave oven, the results would be spotty at best, and a poor quality product would be almost always produced. Because of this, pure, high quality coatings are not offered to the consumer for home processing.

Materials available through specialty shops for the making of home-made chocolates are of generally poor quality because they are not pure coatings. These are artificial products which are not so sensitive to the vagaries of home processing. Their taste, texture, and appearance do not come close to the quality of products produced from pure coatings. The magazine hereinbefore referred to has no source listing for pure chocolate coatings. A person cannot go into a store and purchase such materials. The severe limitation of using these materials in the home is well recognized.

In order to demonstrate how tricky the process can be, a brief listing of some of the more common defects in pure coating candy production, their causes and remedies is as follows:

| APPEARANCE BOTTOM | APPEARANCE TOP | CAUSE | REMEDY |
| --- | --- | --- | --- |
| Cloudy | Cloudy | Coating too cold | Increase temp 1 deg. F. |
| Acceptable | Dull/low luster | Coating not properly tempered | 1. Add lump coating 2. Increase temp 1 deg. |
| Shiny | Cloudy | Coating too hot | Decrease temp 1 deg. F. |
| Cloudy | Luster with spots | Coating too hot | Repeat complete start-up procodure |
| Wet/sticky | Wet/sticky | Coating too hot | Repeat complete start-up procedure |

The principal object of the invention is to provide home chocolate processing apparatus which produces very high quality pure chocolate candies at home.

Another object of the invention is to provide home chocolate processing apparatus which is of simple and compact structure.

Still another object of the invention is to provide home chocolate processing apparatus which is inexpensive in initial cost and in operation.

Still another object of the invention is to provide home chocolate processing apparatus which may be successfully operated by inexperienced, non-expert people, at home.

Yet another object of the invention is to provide home chocolate processing apparatus which automatically or semiautomatically tempers and maintains the temper in any of the highest quality chocolate coating available.

Another object of the invention is to provide home chocolate processing apparatus which enables an unskilled user to produce, with relative ease and positive assurance of success, chocolate candies which are equal to the finest commercially produced chocolates made.

Still another object of the invention is to provide home chocolate processing apparatus which is capable of processing from one quarter pound to over ten pounds of chocolate per day.

Still another object is to provide a method for making chocolate at home.

BRIEF SUMMARY OF THE INVENTION

In accordance with the invention, chocolate processing apparatus comprises a casing, a bowl removably mounted in the casing for accommodating a coating, moving means in the casing coupled to the bowl for rotating the bowl, heating means in the casing in operative proximity with the bowl for melting and coating, cooling means in the casing in operative proximity with the bowl for cooling the coating, baffle means mechanically mounted to the casing to keep separate the unprocessed lump coating and the processed melted coating, scraper means attached mechanically to the baffle situated so as to scrape molten coating from the bowl into a rotating molten pool of coating thereby providing agitation to the molten coating, and control means electrically connected to the heating means and the cooling means for controlling the heating and cooling of the coating.

The control means includes a source of power and temperature sensing means electrically connected to the control means for controlling the heating and cooling of the coating to a plurality of predetermined temperatures.

A control panel is provided on the casing for accommodating the control means.

The moving means includes bearing means having a cavity of predetermined geometric configuration and an electric motor coupled to the bearing means and wherein the bowl has a pin extending from the bottom thereof and removably seated in the cavity whereby the motor rotates the bowl when the motor is energized.

A baffle has spaced opposite first and second ends. Hinge means hingedly affixes the first end of the baffle to the casing. Snap means releasably affixes the second end of the baffle to the casing in a manner wherein the baffle extends substantially diametrically across the open top of the bowl.

A top cover is hingedly affixed to the casing for selectively closing and opening the casing and which performs the function of a work surface when open.

The temperature sensing means includes a thermocouple formed as an integral part of the baffle.

A flexible scraper is affixed to the baffle and abuts the inner surface of the bowl for scraping melted coating from the inner surface into a molten pool in the bowl.

According to one embodiment the baffle plate has horizontal flanges to provide additional strength.

Preferably the temperature probes are molded into the baffle.

According to a preferred embodiment, the baffle has an opening which allows part of the molten chocolate to emigrate to the back side of the baffle, so as to split the flow into two separate streams.

A baffle plate is supported substantially horizontally by the baffle for preventing unprocessed lump chocolate added to the rear of the baffle from riding over the rim of the bowl as the bowl rotates.

Legs are foldably mounted on the top of the top cover for supporting the top cover as a work surface when the top cover is open.

In accordance with the invention, a method of processing chocolate at home comprises the steps of rotating the bowl having unprocessed lump coating therein, selectively heating the bowl in which the lump coating resides, thereby transferring the heat to the lump coating whereby the melted coating adheres to the bowl surface and is then scraped from the bowl into the molten pool, selectively cooling the coating, and controlling the heating and cooling of the coating to predetermined temperatures and in a predetermined cycle.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENTS

Figure 1:
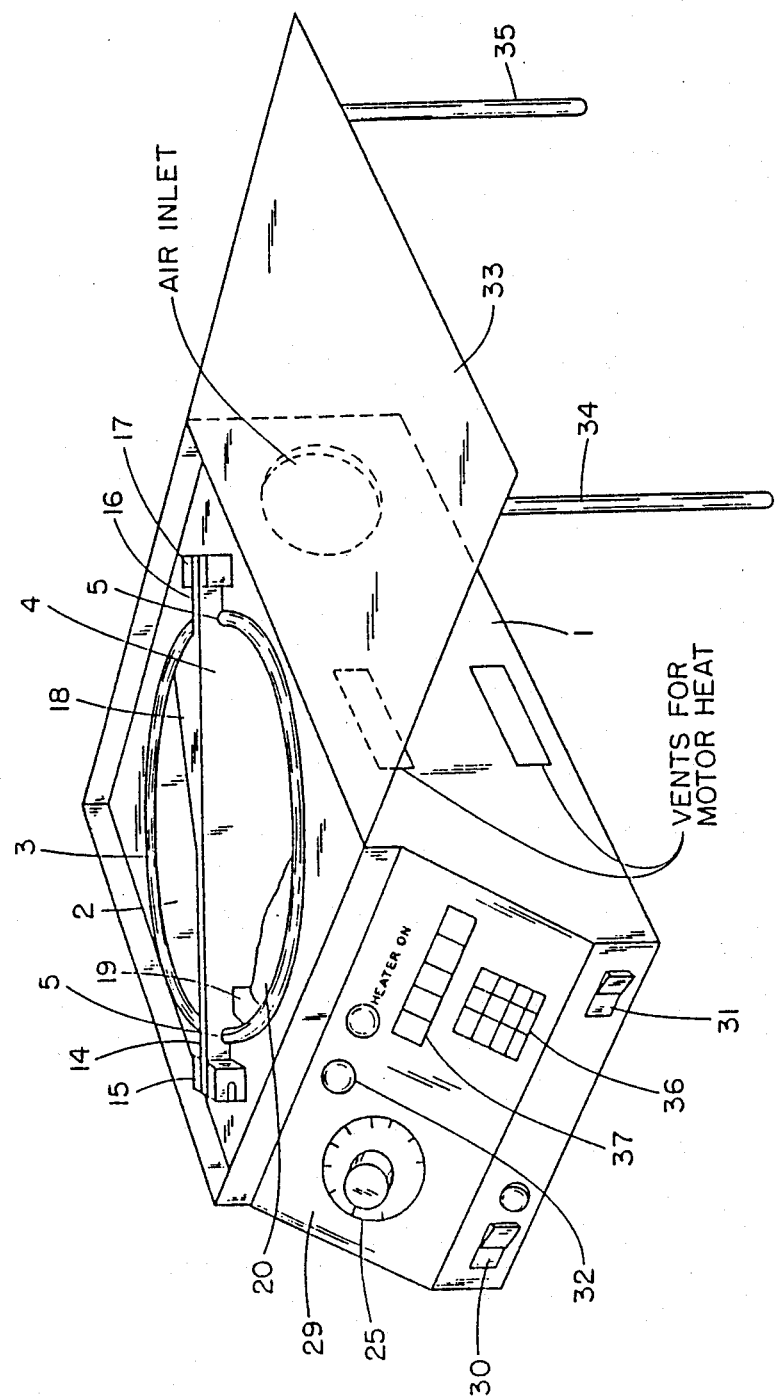
FIG. 1 is a perspective view of an embodiment of the home chocolate making apparatus of the invention.

A casing 1 (FIGS. 1 to 4) houses all the major components of the apparatus of the invention. The casing 1 preferably comprises any rigid material which will withstand temperatures up to 150 degrees F.

A bowl assembly 2 (FIGS. 1 to 5A and 5B) consists of stainless steel or other inert rigid material. The rim 3 of the bowl 2 is turned down and functions as a barrier to materials entering the casing 1. The casing 1 has a raised rim which comes up underneath the bowl rim 3 which further functions as a barrier to materials entering casing 1. Baffle 4 (FIGS. 1, 2, and 4) maintains the lateral position of the bowl by engaging the bowl rim 3 by means of matching slots 5 when lateral loads are applied to it.

The bowl 2 is removably mounted in a bearing assembly 6 (FIGS. 2 and 3) which permits the bowl to be easily removed for cleaning and/or replacement. The bearing assembly 6 accepts a pin 7 extending from the bottom of the bowl 2, so that rotational forces can be applied to the bowl (FIGS. 2 and 3).

The use of easily replaceable bowls permits more than one bowl to be used during processing, should the user want to have, for example, one bowl for dark chocolate and another for milk chocolate coating. This permits the user to quickly shift from one material to the next. Also the bowl may be replaced easily if it becomes damaged.

Figure 2:
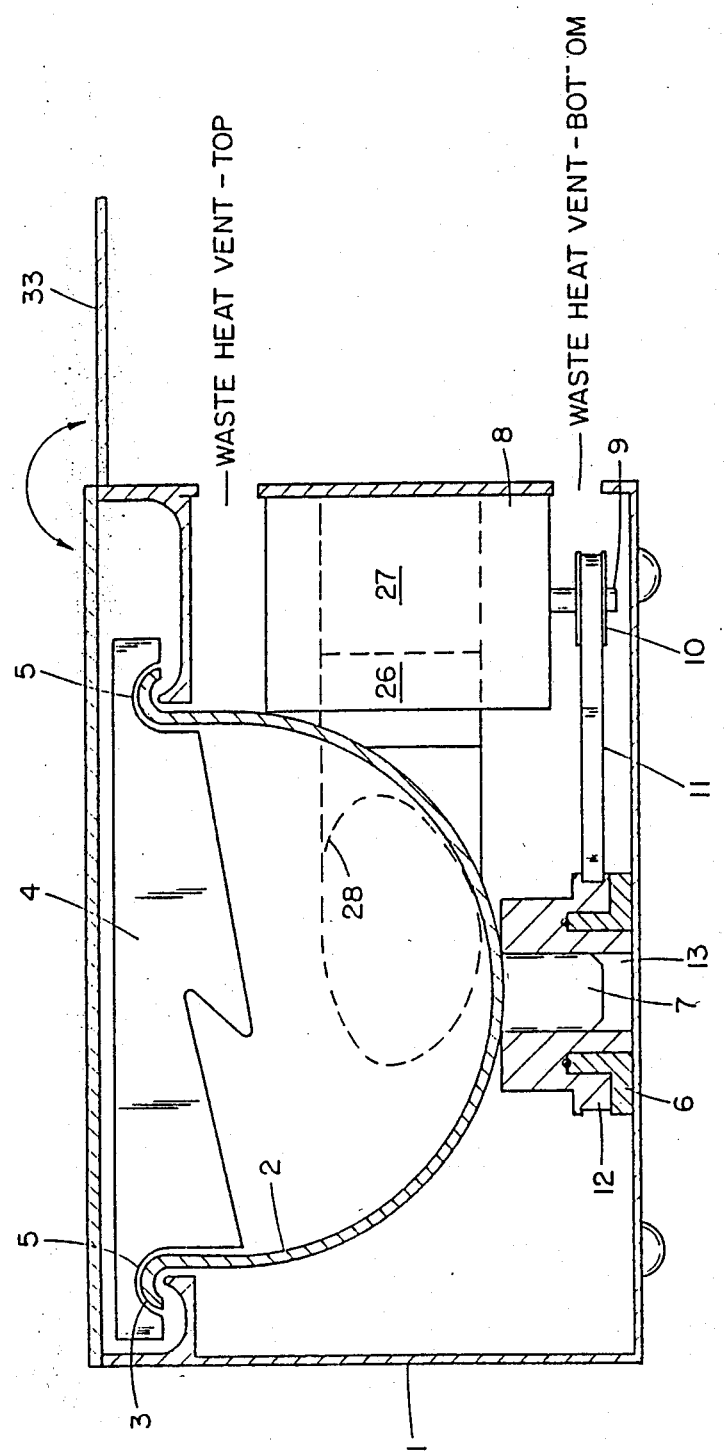
FIG. 2 is a cutaway front view of the embodiment of FIG. 1.
Figure 3:
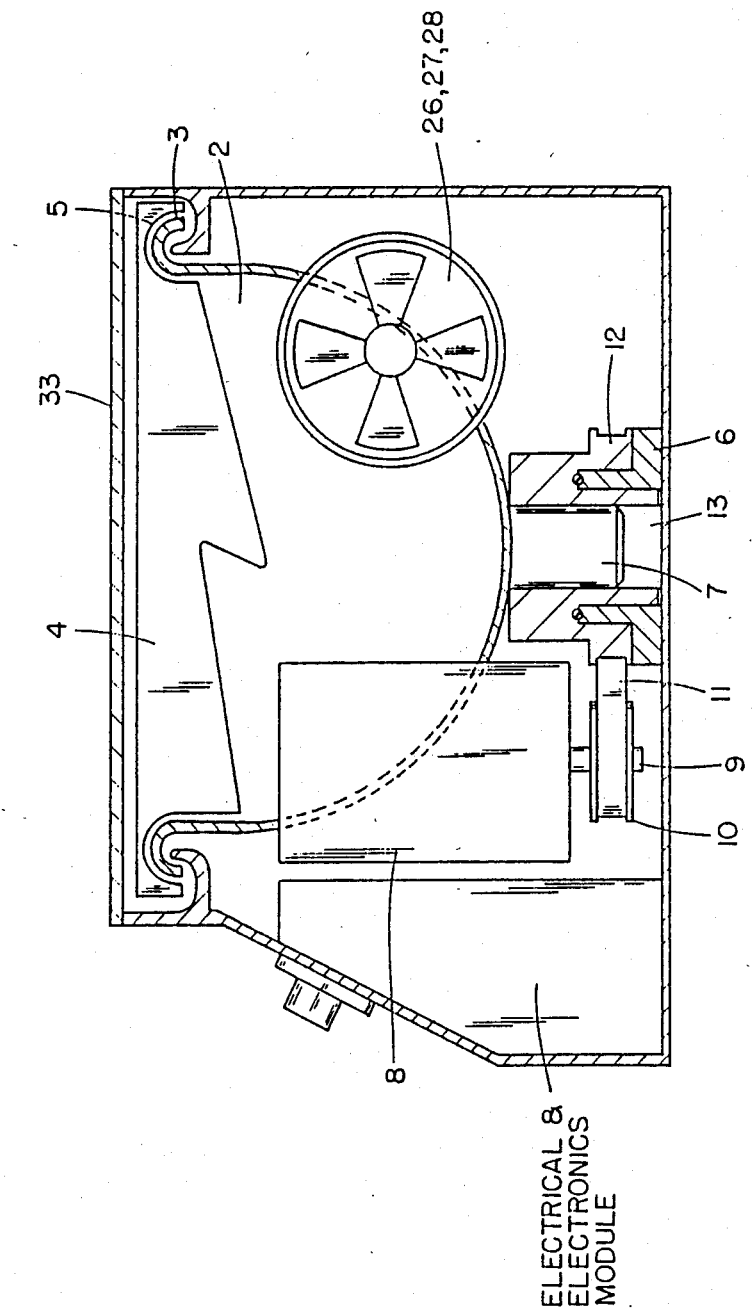
FIG. 3 is a cutaway side view of the embodiment of FIG. 1.
Figure 4:
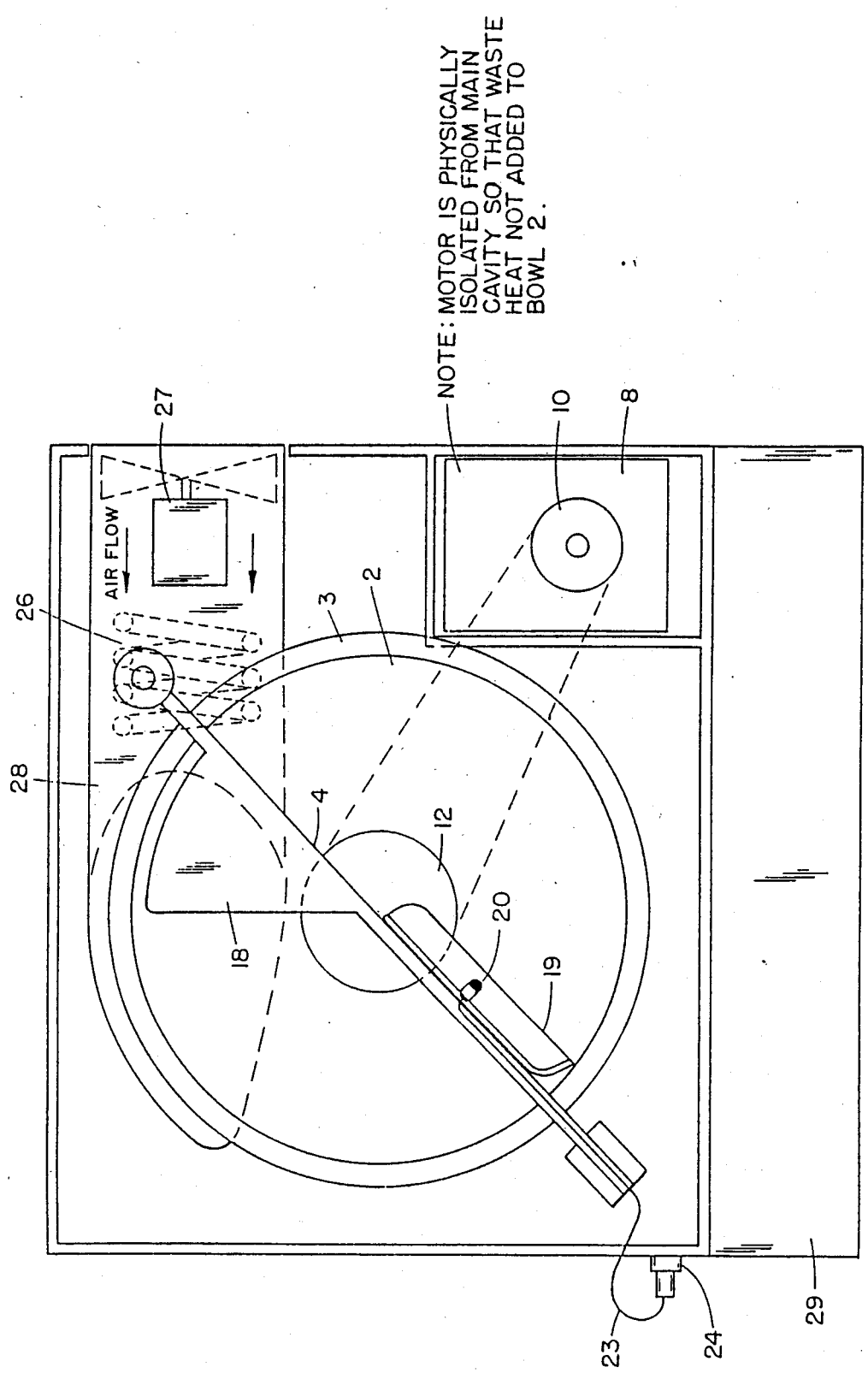
FIG. 4 is a top view of the embodiment of FIG. 1.
Figure 5A:
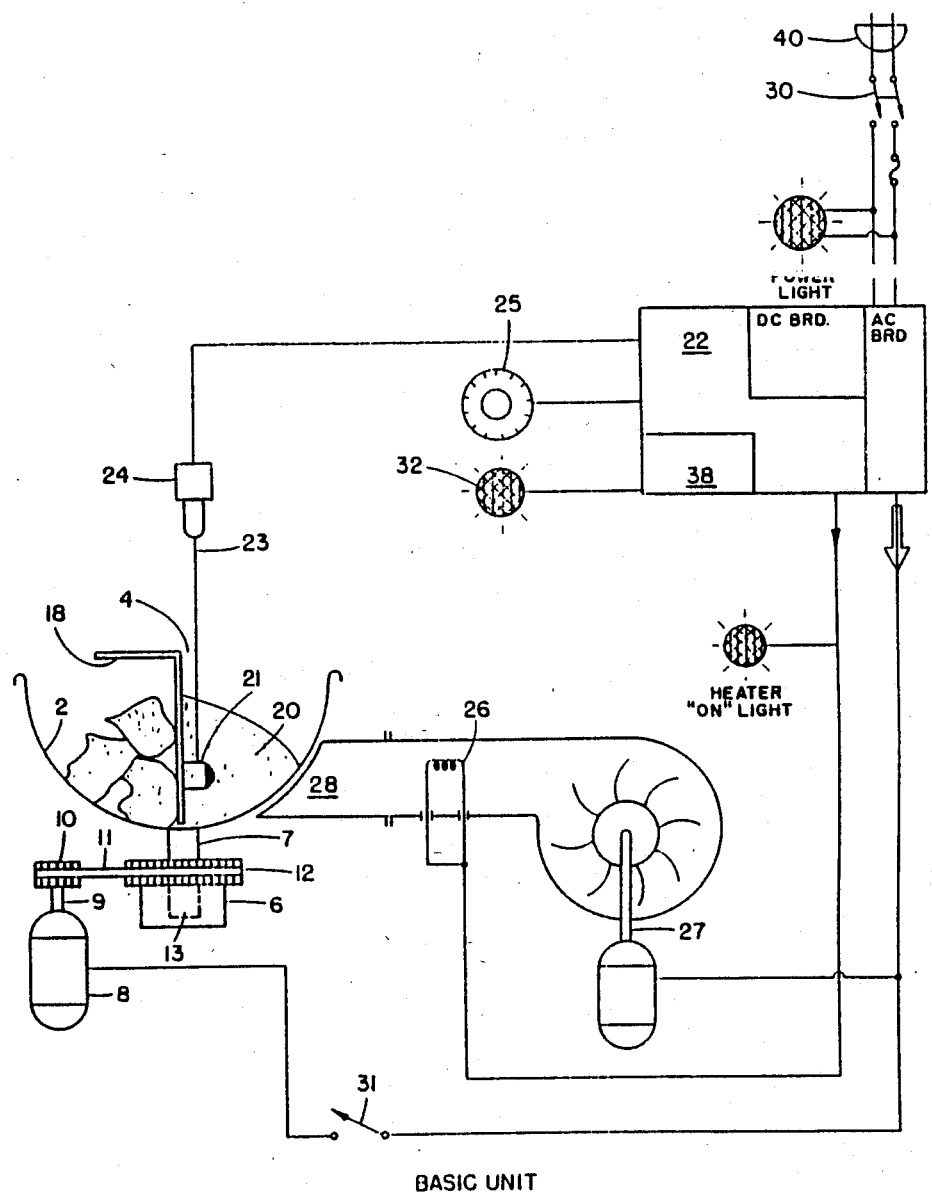
FIG. 5A is a circuit diagram of an embodiment of the control circuit of the apparatus of the invention.
Figure 5B:
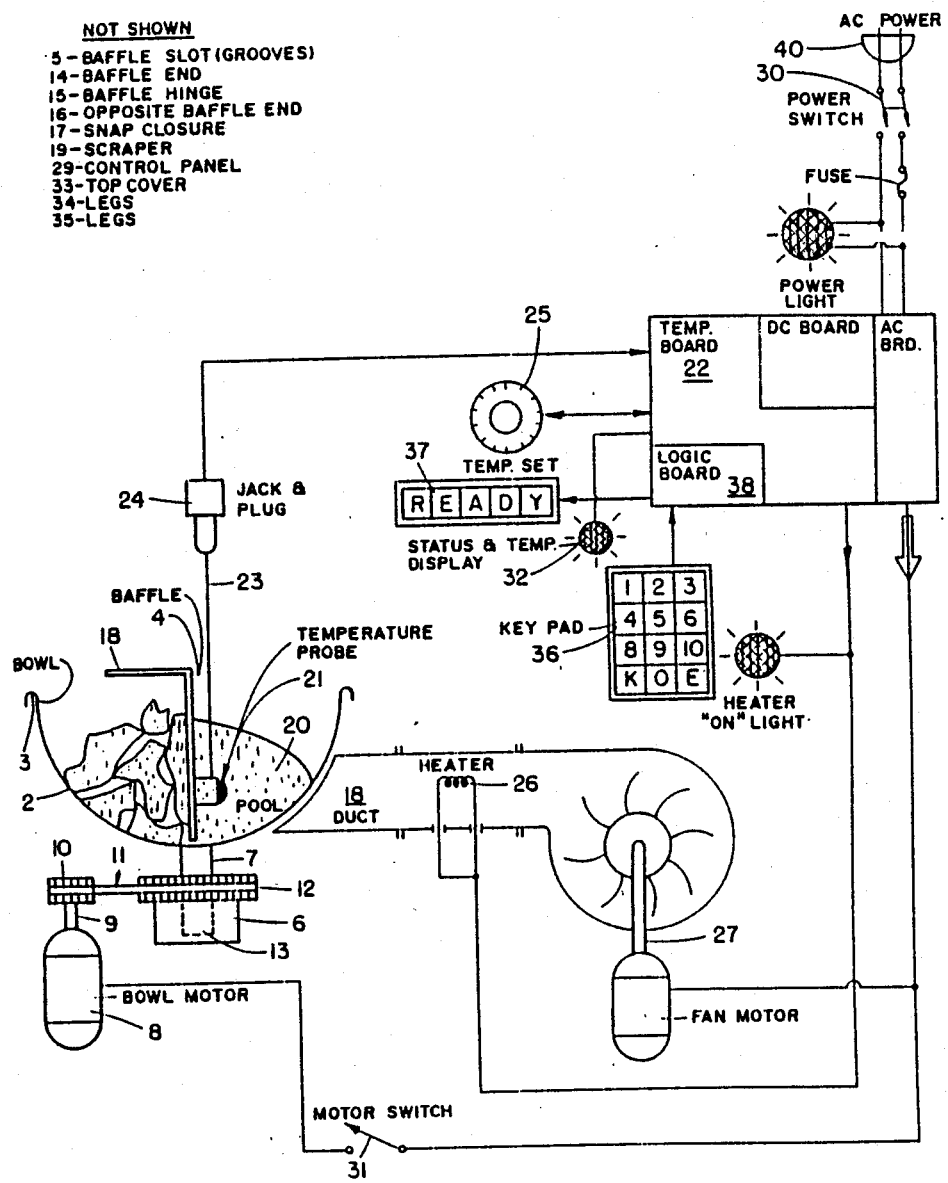
FIG. 5B illustrates a deluxe unit.

The bearing assembly 6 is driven by a drive gear motor 8 (FIGS. 2 to 4) having a shaft end 9 (FIGS. 2 and 3) equipped with a pulley wheel 10 (FIGS. 2 and 4) which engages a toothed drive belt 11 (FIGS. 2 and 4). The bearing assembly 6 has a pulley 12 (FIGS. 2 to 4). The speed reduction between the drive pulley 10 and the bearing pulley 12 is approximately 2:1 so that the bearing assembly rotates at approximately 20 rpm and has a torque of approximately 30 inch pounds. The bearing assembly 6 is arranged as a thrust type, which permits vertical loads to be applied to it while the bearing rotates. The top of the bearing assembly 6 has a splined or square shaped cavity 13 (FIGS. 2 and 3) which accepts the pin 7 extending from the bottom of the tempering bowl 2 (FIGS. 2 and 3). When the bowl 2 is in place, gravity and baffle 4 keep the bowl pin 7 in the bearing cavity 13.

The drive motor 8 is preferably a small fractional horsepower gear motor which has a torque of approximately 15 inch pounds and rotates at approximately 40 rpm.

The baffle 4 is preferably made from a single sheet of a rigid material. The baffle 4 is attached to one end 14 to the casing 1 via a hinge arrangement 15 (FIGS. 1 and 4) which provides for a slip pin (not shown in the FIGS.)

to rigidly hold the end of the baffle in place relative to the bowl 2. The opposite end 16 of the baffle 4 is equipped with a simple snap closure 17 (FIGS. 1 and 4). The baffle 4 may be easily removed for cleaning by undoing the snap closure 17, raising baffle 4 and slipping baffle 4 from its hinge 15. Removing baffle 4 allows bowl 2 to be pulled upwards for removal.

The undersides of the baffle plate ends 14 and 16 are equipped with grooves 5 (FIG. 1), which engage the rim of the bowl 2 thereby maintaining the lateral position of the bowl 2.

The leading edge of the baffle 4, where it is adjacent to the inner surface of the bowl 2, is equipped with a flexible scraper 19 (FIGS. 1 and 4) which scrapes melted coating from the inner surface of the bowl into the molten pool 20 (FIG. 1) at the front of said bowl.

The top back half of the baffle 4 supports the horizontal baffle plate 18 which functions to prevent lump chocolate coating added to the rear of the baffle from riding up the side of the bowl 2 and over the rim 3 as the bowl rotates.

There is no scraper needed on the trailing edge of the baffle 4, since the melted coating adheres to the inner surface of the bowl 2 and is permitted to come around to the leading edge scraper 19, where the melted coating is scraped into the pool 20 of melted coating (FIG. 1).

Agitation of the melted coating pool is accomplished by the actions of the combination of the rotating bowl 2 and the baffle 4 and the baffle scraper 19. Melted coating in the pool is dragged forward by the surface of the bowl 2 to the scraper 19 and then follows a path more or less parallel with the front surface of the baffle 4 until it again reaches the surface of the bowl 2. The speed of movement is greatest at the outer edges of the pool and least at the center. The observed action is a constant shear of the various slip streams of the molten coating.

Figure 1A:
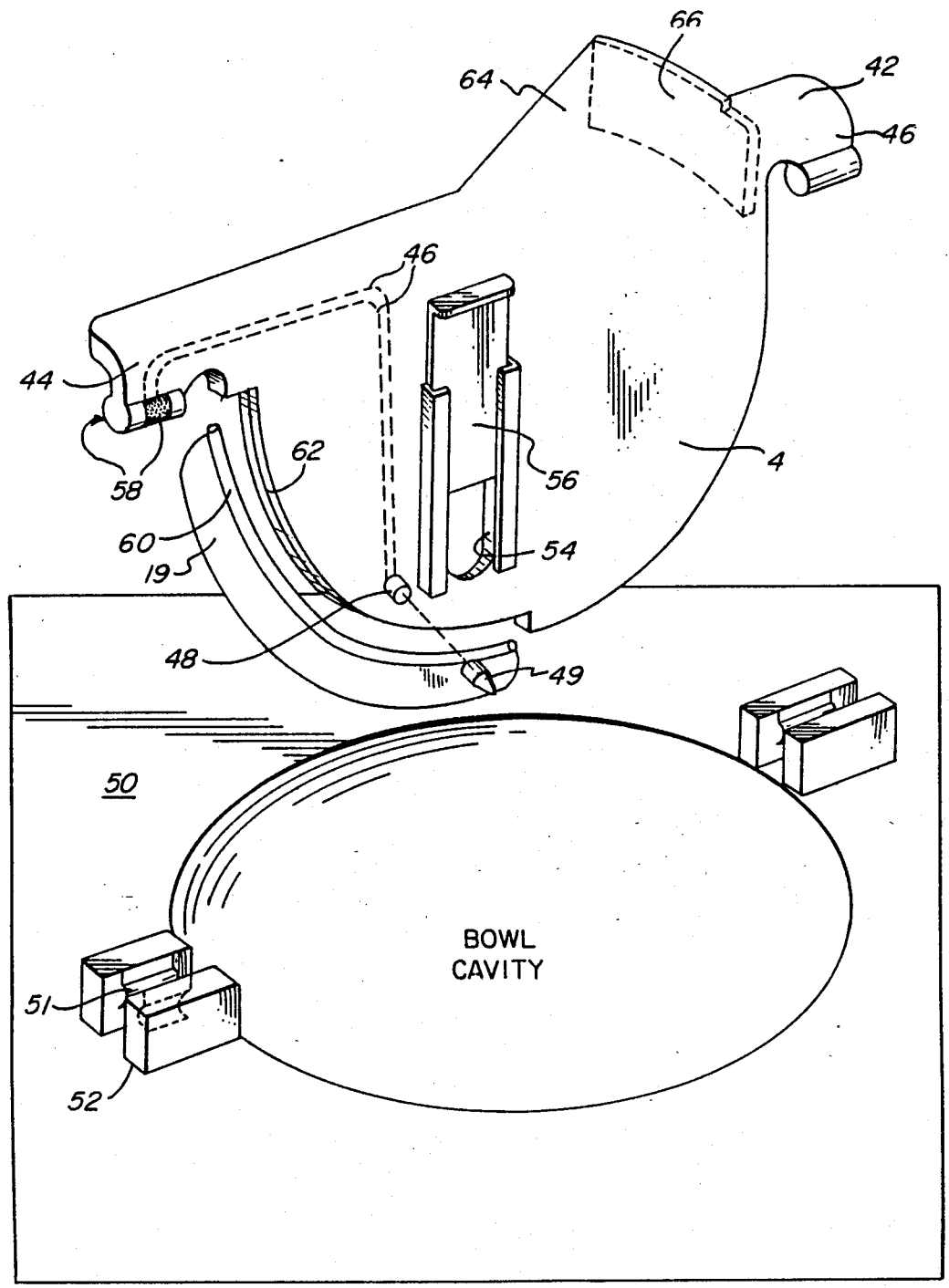
FIG. 1A illustrates a preferred embodiment of the baffle plate.

In the embodiment of FIG. 1A, the baffle plate 4 is strengthened and rendered more stiff by the addition of horizontal flanges 42. This has proved advantageous because the bulk chocolate which is to be melted and which is placed behind the baffle exerts considerable pressure against the inside back of the baffle, thereby applying torque to the baffle retaining flange 4.

The temperature sensing system includes a temperature probe immersed in the pool 20 of molten coating, as shown in FIG. 5. The temperature probe 21 is attached to temperature sensing circuitry 22 which controls the rate at which power is applied to the heating coil 26. The temperature probe is an integral part of the baffle assembly 4, which eliminates the possibility of damage to said temperature probe from the use of the utensils normally used in candy production.

The temperature probe 21 is electrically connected to a temperature sensor or temperature sensing circuit 22 by a short cable 23 coming from the baffle and plugged into a suitable socket 24 on a side of the casing 1, as shown in FIG. 5. This arrangement facilitates removal of the baffle 4 for cleaning and keeps the plug/socket connection 24 out of the way of contaminants, which could degrade the temperature sensing sensitivity and accuracy.

The temperature control system includes the temperature sensor 22 and appropriate temperature setting controls 25 connected to the sensor, and this system control the rate at which power is applied to the heating element 26 (FIGS. 2, 4 and 5).

In the embodiment of FIG. 1A, the temperature probes 21 to electronics connectors 58 are molded into one of the baffle plate retaining flanges, one being placed on each side of the flange to keep them separated and electrically isolated. The temperature probe wires 46 leading from the connectors 58 are also molded into the baffle, a fact which reduces the possibility of damage to these components in normal use. The opposite ends of the wires are connected to a molded-in socket assembly 48 which accepts the temperature probe cartridge 49. The temperature probe cartridge is replaceable because it is a part of the assembly which could be damaged in use.

The DC voltage to the electronics connectors and temperature probe are well below 1 volt and therefore present no electrical hazard.

Both baffle retaining flanges 44 are rigidly attached to the top of the machine housing 50 by means of spring loaded metal clips 51 which are permanently attached to the baffle indexing assembly 52. The clips which match the location of the electronics connectors 58 are electrically wired to the temperature sensing electronics inside of the machine.

In normal use, the user simply locates the baffle 4 over the center of the bowl and presses the baffle plate horizontal flange ends 42 downward into the baffle indexing assembly 52 until the spring loaded metal clips engage and hold the baffle retaining flanges firmly in place. At the same time, firm electrical connection is made between the baffle electronics connectors 58 and the electrified spring loaded clips 51.

Removal of the baffle is accomplished by pulling up on the ends of the horizontal flanges 42.

The desired crystal growth rate of of the molten chocolate contained in the rotating bowl is partly related to the degree of agitation of the molten chocolate. The process of crystallization may be accelerated and the degree of agitation may be improved by the provision of an opening 54 placed in the baffle which allows a portion of the molten chocolate to migrate to the back of the baffle, thereby splitting the flow into two separated streams. The size of the opening and therefore the volume of chocolate migrating to the back side of the baffle is controlled by a movable dam 56 which may be closed or opened as desired.

In order to prevent the molten chocolate located on the back side of the baffle to climb on the side of the bowl and spill on the cabinet top, a plate extension 64 is added to the horizontal flange 42 over the bulk chocolate side of the baffle. Attached to the plate extension is a vertical curved baffle 66 which extends downwardly until it is slightly inside the bowl lip very close to the inside surface of the bowl.

Cooling fan 27 (FIGS. 4 and 5) is always running while the apparatus is in use. The heating 26 shares the same housing as the fan 27. The outlet of the fan is connected to the duct 28. The outlet of the duct 28 impinges the outside surface of the bowl 2 tangentially and the air flow from the duct either heats or cools the bowl depending on the temperature sensing circuitry demand.

The maximum power requirement for the heater element is in the order of 200 watts at maximum heating rate.

The heating element 26 is recessed in the duct in a manner whereby if the bowl 2 is removed, children's fingers could not reach or touch it. A safety interlock switch is utilized to cut off all power to the apparatus when the bowl 2 is removed.

The bowl 2 may be heated by other methods, such as, for example, induction heating via electrical energy transmission from a radiating source to a suitable coil permanently attached to the outside surface of the bowl 2 or by radiant energy from a detached heat source such as a heating element under the bowl 2.

A control circuit 38 (FIG. 5) has logic which permits either the heating element 26 or the fan 27 to be on, but prevents the heating element and the fan from being on simultaneously or off simultaneously and operates according to the need for heat as sensed by temperature probe 21.

The casing 1 houses the control circuitry and has a control panel 29 (FIG. 1) which includes at least a main power switch 30 (FIGS. 1 and 5), the temperature setting control 25 (FIGS. 1 and 5), a motor control switch 31, and a suitable annunciator 32 (FIGS. 1 and 5) such as, for example, a light, meter, busser or combination.

The casing 1 has a top cover 33 (FIGS. 1 to 3) hinged to the casing so that it may be completely removed, or flipped to the side and used as a work surface which is at the same height as the working part of the apparatus, as shown in FIGS. 1 and 2. The cover 33 has support means for stabilizing it when used as a work surface. The support means may comprise legs 34 and 35 (FIG. 1) which fold into recesses in the cover 33 when the cover closes the casing 1. The top rim of the casing 1 is raised slightly higher so that when the cover 33 is in place, the apparatus is protected from outside contamination. Furthermore, when the cover 33 is closed, the startup procedure is speeded up due to minimized heat loss from the top surface of the bowl 2.

The apparatus of the invention may be basically controlled by manual operation of the calibrated temperature setting controls 25 to control the temperature cycles. In such operation, the user places lump coating in the bowl 2. The user turns on the main power switch 30, which causes the motor 8 to rotate the bowl 2. The user then sets the first temperature via the temperature setting control 25. When the "ready" annunciator 32 is energized, the user sets the second temperature via the temperature setting control 25. When the "ready" annunciator 32 is again energized, the user sets the process temperature on the temperature setting controls. When the "ready" annunciator is energized again, the coating is ready for use.

In automated operation of the apparatus of the invention, a microprocessor automates all the cycles to provide perfectly tempered molten chocolate. Since different formulations of coatings require somewhat different tempering cycles, the system must be flexible enough to accommodate these differences.

As an example, it is assumed that a coating has the following heat cycle requirements.
1. Startup temperature of 105 degrees F.
2. Intermediate temperature of 78 degrees F.
3. Process temperature of 86 degrees F.

The operation is as follows:

The user places the lump coating in the bowl 2 at the back of the baffle 4 and turns on the main power switch. The user then turns the keypad 36 (FIGS. 1 and 5) on the control panel 29 to input the three temperatures, one at a time. An alphanumeric display 37 (FIGS. 1 and 5) will prompt the user during this input stage. When the input stage has been completed, the alphanumeric display 37 will display the temperature of the molten coating as it goes through the temperature cycles. Upon final entry, the apparatus is thus activated and the bowl 2 rotates, the fan 27 and the heating element 26 are turned on. When the pool of molten coating reaches 105 degrees F., the heating element 26 is turned off. When the molten coating reaches 78 degrees F., the heating element 26 is again energized. Numeral 40 is a source of electric power.

As the molten coating begins to approach 86 degrees F., the power to the heating element 26 is gradually decreased until the molten coating has reached 86 degrees F., at which time the power to the heating element is off. As the temperature of the pool starts to drop, power is proportionally added to the heating element. There is very little hysteresis using this approach and it allows for a delta T of less than 0.1 degree F. of the set temperature. The alphanumeric display will display a "ready" condition and the user may then make chocolate candies.

A control 25 is provided to manually override the process temperature by plus or minus two degrees F. This control allows for fine tuning the process temperature which affects the viscosity of the coating. For example, if one wished to have a thicker coating, decreasing the temperature a degree would provide a more viscous product.

When the process is finished, the user may elect to leave the coating in the bowl 2 for later use. The set temperature may be maintained in order to minimize startup time for the next session. It may be raised, lowered, or turned off. The user may elect to scrape the bowl 2 contents into a container for later use and remove the baffle 5 and said bowl for cleaning.

It is possible to include a programmable read-only memory circuit in the control circuit 28 so that a three digit code could be entered via the keys 36 for selection of the proper temperature cycles for given coatings. The package of lump chocolate could have the proper code imprinted on it and/or a "cookbook" may be included with the apparatus to provide the proper codes for a wide variety of coatings.

The average temperature of the molten pool is easily kept within 1/5 degree F. when using proportional heating as opposed to on/off heating. This is made possible by using very low thermal mass but rugged temperature probes which respond in a few milliseconds to changes of as little as 1/50 degree F.

While the invention has been described by means of a specific example and in a specific embodiment, I do not wish to be limited thereto, for obvious modifications will occur to these skilled in the art without departing from the spirit and scope of the invention.

What is claimed is:

1. A chocolate processing apparatus, comprising:
a casing suitable for home use and having a surface with an opening;
a bowl having a cavity in which chocolate is to be processed;
said bowl being easily removably mountable in the opening of the casing while being shaped to enable rotation when mounted in the opening;
releasably mounted baffle means extending into the cavity of the bowl to establish a first region where bulk chocolate is to be placed and a second region where a pool of molten chocolate is to form;
means in said casing to releasably couple to the bowl and cause relative rotation between the bowl and the baffle means;

heating means for generating heat and directing said heat at the bowl;

means for effectively sensing the temperature of chocolate in the molten pool and producing a temperature signal representative thereof;

means for generating an ambient air flow and directing said air flow at the bowl without the influence of waste heat generated by said means for causing said relative rotation; and control means responsive to the temperature signal for controlling said heating means to establish a desired heating and cooling of the temperature of the chocolate in the molten pool so as to form tempered chocolate.

2. The chocolate processing apparatus as claimed in claim 1 wherein the air flow generating means is located inside the casing and directs the air flow at an outer surface of the bowl.

3. The chocolate processing apparatus as claimed in claim 2 wherein said heating means is inside the casing and the air flow generating means is located so as to direct the air flow in heat exchange relationship with and past the heating means before impinging on the bowl outer surface.

4. The chocolate processing apparatus as claimed in claim 1 wherein the means for causing said relative rotation includes an electric motor, said electric motor being so located so as to isolate waste heat produced by the electric motor from the bowl.

5. The chocolate making apparatus as claimed in claim 4 wherein the baffle means includes a baffle connector and wires coupled to the temperature probe and to the baffle connector; and connector means on the casing for releasably engaging the baffle connector to couple the temperature signal to the control means.

6. The chocolate processing apparatus as claimed in claim 5 wherein the chocolate temperature sensing means includes a temperature probe mounted in an integral manner with the baffle means.

7. The chocolate processing apparatus as claimed in claim 1 wherein said baffle means is provided with an opening sized to enable molten chocolate to migrate from said second region into the first region.

8. The chocolate processing apparatus as claimed in claim 7 wherein the baffle is further provided with a movable dam that is located so as to control the size of the opening in the baffle means and the amount of migration.

9. The chocolate making apparatus as claimed in claim 1 and further including:

a temperature sensor mounted to the baffle for submersion therewith in the zone of melted chocolate;

connector means mounted to the casing and effectively coupled to the control means; and wire means embedded in the baffle for coupling the temperature sensor to the connector.

10. The chocolate making apparatus as claimed in claim 9 wherein the control means includes a microprocessor coupled to the connector means to respond to the temperature signal.

11. The apparatus according to claim 1 wherein the baffle means comprises a substantially horizontally oriented baffle plate, said baffle plate having a perimeter located curved vertical segment at an end thereof.

12. The apparatus according to claim 1 wherein said temperature sensing means comprises temperature probe wires molded into said baffle means, a molded-in socket assembly, and a probe cartridge to replaceably connect into the socket assembly.

13. The apparatus according to claim 12 wherein the apparatus comprises electrical connectors, one of said connectors being connected to said probe wires and another connector being coupled to the control means; said latter connector including spring loaded metal clips to operatively retain said baffle means.

* * * * *